United States Patent [19]

Martins

[11] Patent Number: 4,569,770

[45] Date of Patent: Feb. 11, 1986

[54] BARIUM COMPOUND-CONTAINING THICKENING AGENT AND DRILLING FLUIDS MADE THEREFROM

[75] Inventor: Evon Martins, Somerville, N.J.

[73] Assignee: Engelhard Corporation, Menlo Park, N.J.

[21] Appl. No.: 579,529

[22] Filed: Feb. 13, 1984

[51] Int. Cl.$^4$ ................................................ C09K 0/4
[52] U.S. Cl. .............................. 252/8.5 B; 252/315.5
[58] Field of Search .............. 252/8.5 A, 8.5 B, 315.5; 71/DIG. 1, 64.08

[56] References Cited

U.S. PATENT DOCUMENTS

| | | | |
|---|---|---|---|
| 2,529,760 | 11/1950 | Bergman | 252/8.5 |
| 2,856,355 | 10/1958 | Weiss et al. | 252/8.5 |
| 3,148,970 | 9/1964 | Smith et al. | 71/54 |
| 3,185,642 | 5/1965 | Sawyer et al. | 252/8.5 |
| 4,318,732 | 3/1982 | Sawyer | 71/64.08 |

FOREIGN PATENT DOCUMENTS

| | | |
|---|---|---|
| 541643 | 5/1957 | Canada . |
| 542838 | 6/1957 | Canada . |
| 2349405 | 6/1974 | Fed. Rep. of Germany . |

Primary Examiner—Prince E. Willis
Attorney, Agent, or Firm—Inez L. Moselle

[57] ABSTRACT

A drilling fluid comprises uncalcined colloidal attapulgite clay and up to about 10% by weight (of the weight of attapulgite clay) of a barium compound additive such as BaO or Ba(OH)$_2$. The admixture of clay and barium compound may be slurried in either fresh or salt water to provide an aqueous drilling fluid of significantly higher yield than that attainable with prior art drilling fluids.

17 Claims, 4 Drawing Figures

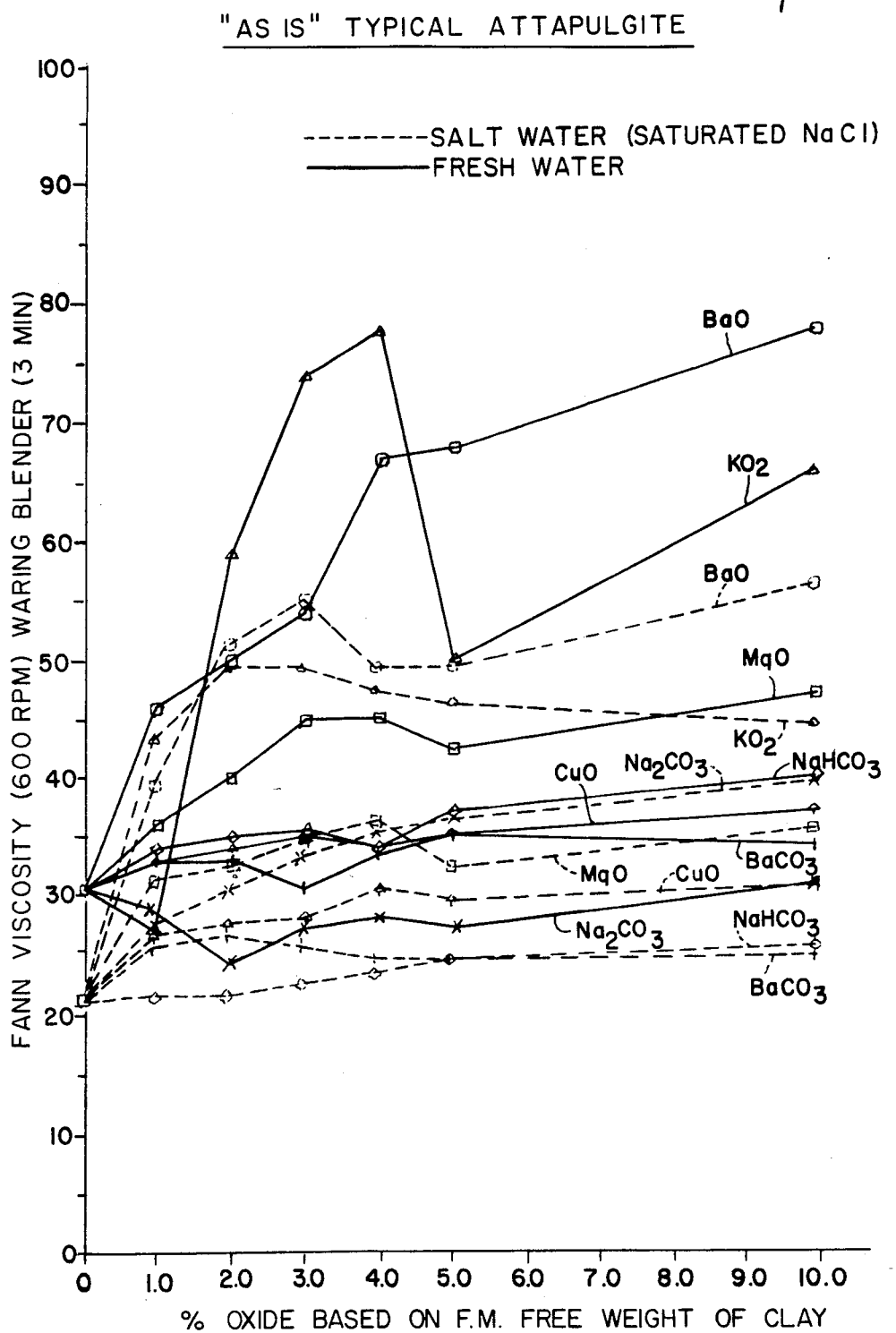

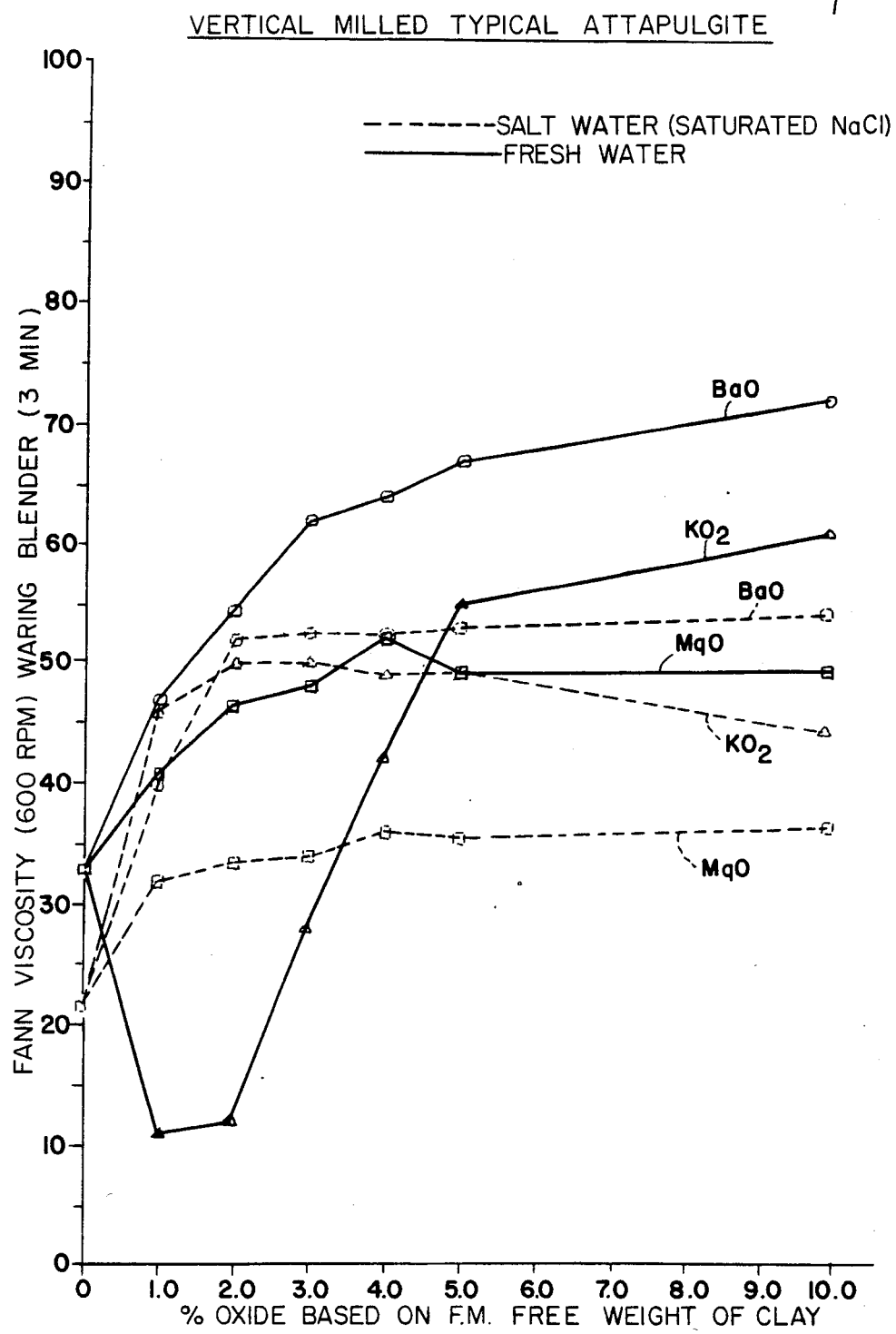

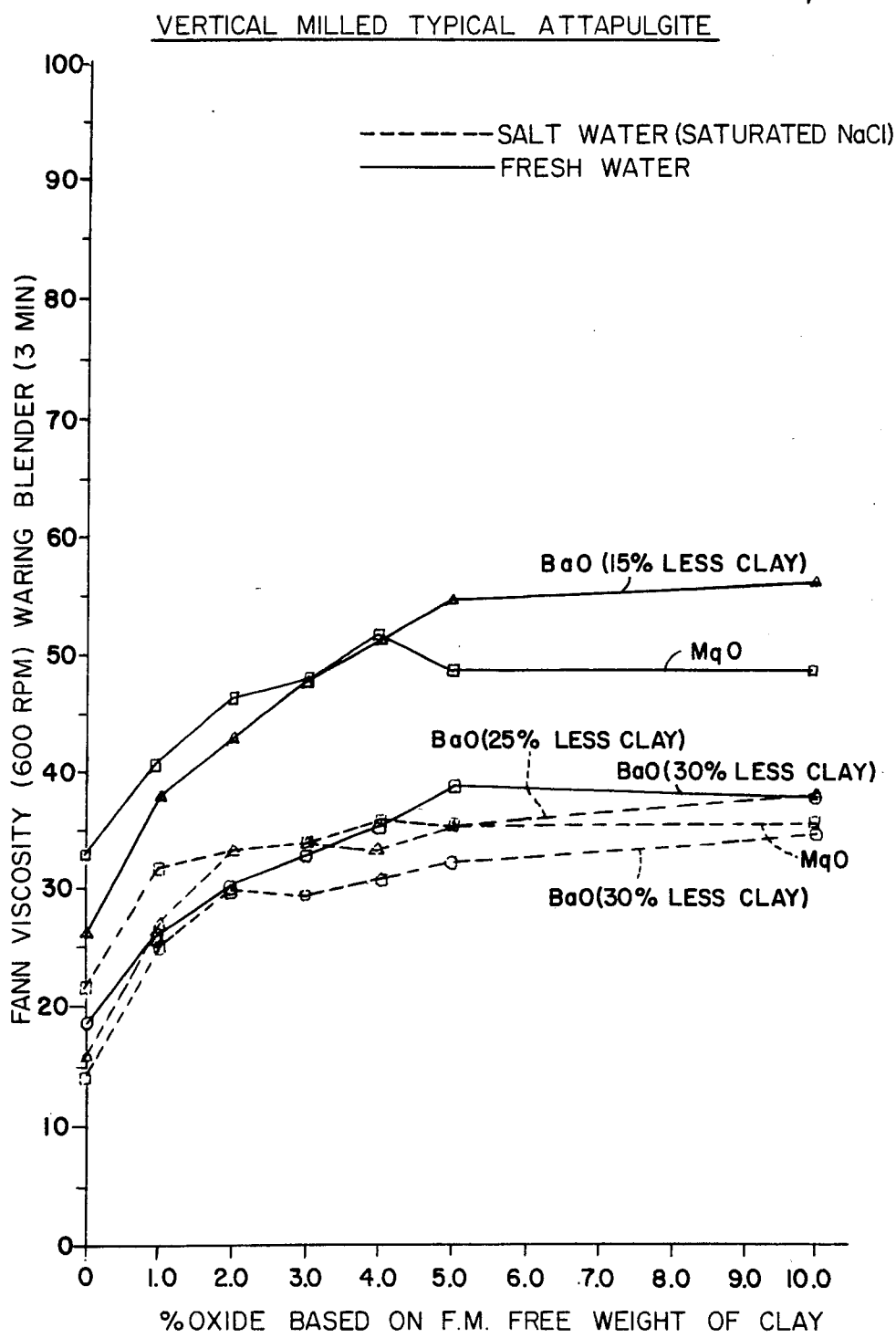

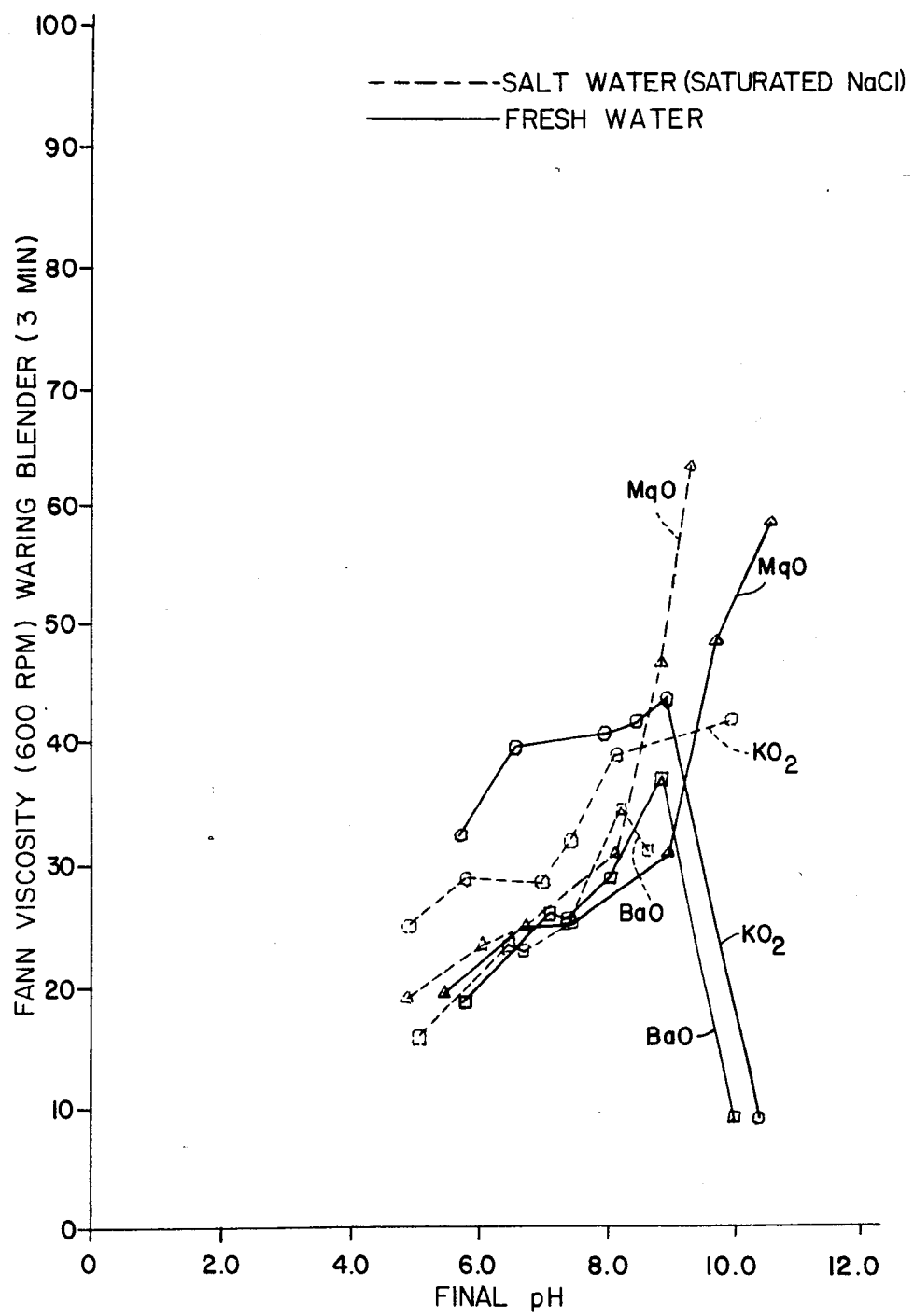

BARIUM COMPOUND-CONTAINING THICKENING AGENT AND DRILLING FLUIDS MADE THEREFROM

BACKGROUND OF THE INVENTION

1. Field of the Invention

The present invention concerns a thickening agent for aqueous drilling fluids and aqueous drilling fluids obtained thereby. Such fluids are well suited for use in the rotary drilling of wells, such as oil wells.

In the rotary drilling of wells, a drilling fluid is introduced into the well bore to remove cuttings, to cool the drill bit and to seal formations. The drilling fluid, or drilling mud as it is sometimes called, must be sufficiently viscous to carry the cuttings from the well bore and to suspend particles of weighting agent. However, the mud viscosity must not be so high as to interfere with the action of pumps which circulate the drilling fluid in the formation. Generally speaking, the Stormer viscosity of a drilling fluid should be within the range of about 10 to 40 centipoises (cp.), more usually about 15 to 30 cp. Colloidal clays, usually specially processed colloidal clays, are generally employed to impart the desired viscosity to drilling fluids.

The mud-making qualities of a clay are indicated by certain properties of an aqueous suspension of the clay. Among the most important of these properties is the yield of the clay, the term "yield" being defined as the number of barrels of mud having an apparent viscosity of 15 cp. (as determined on a Stormer-type viscometer) that can be made from one ton of clay. In the case of salt-water muds, the yield of the clay in a saturated sodium chloride solution is determined, since such a value is indicative of the performance of the mud in its intended application. The API procedure for determining mud yield is set forth in API RP-29, Standard Field Procedure for Testing Drilling Fluid, fourth edition, Section A-11, A25-A30 (May 1957). A direct correlation of yield is provided by testing for Fann viscosity of the mud, as described below. The higher the Fann viscosity of the drilling fluid, the higher will be the yield.

It is desirable to make up drilling fluids at low solids to obtain faster bit penetration rates. Therefore, it is highly advantageous to utilize the highest yield clay available to prepare drilling fluids. However, in selecting a clay for use in drilling a formation, careful consideration must also be given to ability of a clay to tolerate contamination encountered during drilling, without appreciable yield reduction. If a mud is made up with a clay whose mud yield decreases appreciably upon contamination, excessive clay solids will be needed to develop sufficient viscosity in the system to remove cuttings from the well bore.

Hydratable clay (i.e., swelling bentonite clay) has been widely used in the making of drilling muds. This type of clay is described in The Encyclopedia of Chemical Technology, vol. 4, page 53. When the base exchange sites of bentonite clay are largely occupied by sodium ions this clay swells in water, as a result of hydration, to a volume 8 to 15 times its dry volume. However, swelling of the clay is decreased sharply when the base exchange positions are occupied by cations such as calcium or magnesium or when a high concentration of any salt, such as sodium chloride, is present. Accordingly, although swelling (sodium) bentonites have a relatively high yield in fresh water, such clays have a very low yield or are incapable of maintaining a high yield in water containing ions that prevent swelling of the clay. Therefore, hydratable clays, such as Wyoming bentonite, present difficulties when a drilling mud must be made up with sea water or brine (as, for example, in certain coastal drilling operations) or when the mud becomes contaminated during drilling through formations of salt, gypsum, anhydrite and the like.

When sea water or brine must be used in making up a drilling mud or where formations of soluble salts of sodium, calcium or magnesium are expected to be encountered in drilling, it is known to use a special type of clay or fullers earth which is mined in Georgia and Florida. This clay, known as "attapulgite clay," is particularly useful for use in low solids, salt water, gyp and high temperature drilling muds because salt and other electrolytes, as well as high temperature, do not adversely effect the colloidal properties of this clay as they do bentonite clay. This is believed to follow from the fact that the mud-making properties of attapulgite clay do not depend upon particle hydration but upon a unique orientation of charged colloidal attapulgite particles in the dispersion medium.

In the production of drilling mud clay of the attapulgite type it is common practice to extrude the raw clay to improve its mud-making properties. In a typical operation, the raw clay is crushed to a size not greater than about one-quarter inch in thickness. Water is added in an amount sufficient to provide a mixture of extrudable consistency, typically to produce a mixture of 50% to 60% volatile matter, and the mixture is pugged and extruded under pressure in an auger type extruder through a die plate. The extrudate is then dried to a volatile matter content of about 20% to 25%. As used herein, the term "volatile matter" refers to the weight percent of clay which is eliminated when the clay is heated to essentially constant weight at about 1800° F. (982.2° C.). The clay is then ground to a suitable fineness. It should be noted that the 1800° F. (982.2° C.) temperature is merely part of the definition of the term "volatile matter". As described below, the clay of the invention is "uncalcined" which term is defined herein to mean that at no time is the clay heated to a product temperature above about 300° F. (148.9° C.). Such elevated product temperature would adversely affect the colloidal nature of the clay and reduce the attainable yield.

For use in drilling muds, the resultant clay powder is dispersed in water or brine and special purpose additives may be incorporated. For example, fluid loss of attapulgite mud may be controlled by addition to the aqueous clay dispersion of organic fluid loss reducing agents such as starch, sodium carboxymethyl cellulose, ferro chrome lignosulfonate and quebracho or combinations thereof.

Generally, the yield of attapulgite clay in both fresh-water and contaminated water systems is excellent and has led to the extensive use of attapulgite drilling clays. The fresh-water yield of attapulgite clay is usually somewhat higher than its salt-water yield and is typically about 150 barrels per ton or more for a good grade of commercial extruded attapulgite clay. It is of course desirable to at least maintain, and preferably to improve, the high yield of the clay in fresh or semicontaminated systems while simultaneously improving the saturated salt-water mud-making properties of the clay.

It is known that the viscosity of aqueous suspensions of "zeolitic clays" such as attapulgite clay varied somewhat with the nature of solutes in the aqueous phase, especially in saturated systems (note U.S. Pat. No. 2,094,316 to Roy Cross and Matthew Forbes Cross). However, such observations led to no practical method for increasing the yield of attapulgite clay in saturated salt-water systems without adversely affecting its yield in fresh-water systems.

2. Description of the Prior Art

U.S. Pat. No. 3,185,642, issued to the assignee of this application, discloses an improved thickening agent for fresh and salt-contaminated aqueous drilling fluids, and aqueous drilling fluids obtained thereby, comprising an admixture of uncalcined (as defined above) attapulgite clay and a magnesium compound selected from hydratable MgO and Mg(OH)$_2$. These additives are said (column 4, lines 14–19 of U.S. Pat. No. 3,185,642) to be unique in their effect upon properties of aqueous dispersions of colloidal attapulgite clay, discovered after extensive experimentation with a wide variety of inorganic reactants, including various alkali and alkaline earth metal salts, oxides and hydroxides.

U.S. Pat. No. 3,509,066, also assigned to the assignee of this application, discloses tetrasodium pyrophosphate (TSPP) as a deflocculating agent for attapulgite clay and incorporates hydratable magnesia, magnesium hydroxide and/or aluminum hydroxide as a viscosity reducing agent for the clay dispersion. At column 4, line 15 et seq, it is noted that other alkaline earth hydroxides, i.e., calcium hydroxide and barium hydroxide, do not produce the same effect as the magnesium or aluminum compounds in conjunction with TSPP. The '066 patent therefore discloses that barium hydroxide does not have a viscosity reducing effect on attapulgite clay when used in conjunction with TSPP.

U.S. Pat. No. 2,856,355 discloses an alkaline aqueous based drilling fluid characterized by a high dissolved barium or barium ion content sufficient to effectively stabilize and control the mud making properties of heaving shale material or clays in contact with the drilling fluid. More specifically, the fluid contains a water soluble barium compound having a solubility in the aqueous phase greater than that of calcium hydroxide and in which the aqueous phase is saturated with respect to the calcium hydroxide (column 2, line 48–62). A colloidal hydratable drilling clay, such as a bentonitic type drilling clay, may be included in the drilling composition.

U.S. Pat. No. 2,744,869 discloses a lime-free barium hydroxide-containing mud which is stated to avoid solidification at high temperature. At column 5, line 32 et seq, it is stated that Table I of the patent shows that treatment of montmorillonite and illite type clays (which are hydratable clays) with barium hydroxide did not cause anything approaching solidification; generally, the resultant drilling muds were as thin as or even thinner than before heating. At column 5, line 39 et seq, the patent notes that with kaolinitic clays the barium hydroxide did cause marked thickening as shown by the data for examples 9 and 10 of Table I, but the thickening only reached a plastic state, while the mud treated with calcium hydroxide turned solid.

U.S. Pat. No. 3,148,970 discloses at column 3, line 7–12 that barium hydroxide (along with lime, magnesium oxide, hydratable magnesium oxide and portland cement, etc.) is suitable as a thickening agent for use in gelled ammonia solutions, i.e., solutions in which ammonia is gelled with clay (attapulgite or sepiolite clay, which stated to be similar to attapulgite clay) to provide a base material capable of suspending finely divided insoluble particles such as plant food material.

SUMMARY OF THE INVENTION

In accordance with the present invention, there is provided a thickening agent for both fresh water and salt-contaminated aqueous drilling fluids comprising an admixture of uncalcined colloidal attapulgite clay and a barium compound comprising one or both of barium oxide and barium hydroxide, the barium compound being present in an amount such that aqueous dispersions of the admixture have a greater Fann viscosity in both fresh and salt water than do otherwise identical aqueous dispersions which lack the barium compound.

The barium compound is preferably present in an amount of about ½ to 10%, more preferably about 1 to 5% by weight of the weight of the attapulgite clay. The barium compound is preferably barium oxide.

In one aspect of the invention there is provided a thickening agent for aqueous drilling fluids comprising uncalcined attapulgite clay and a barium compound comprising one or both of barium oxide and barium hydroxide, preferably barium oxide, and present in an amount of about ½ to 10%, preferably about 1 to 5%, by weight of the weight of the attapulgite clay.

In one aspect of the invention, the attapulgite clay is composed of particles of minus 48 mesh (Tyler) size.

Another aspect of the invention provides a drilling fluid comprising water having dispersed therein uncalcined colloidal attapulgite clay and a finely divided barium compound comprising one or both of barium oxide and barium hydroxide, the proportion of clay to water being such as to form an aqueous mud, and the barium compound being present in an amount such that the mud has a greater Fann viscosity in both fresh and salt water than would an otherwise identical mud which lacks the barium compound.

In another aspect of the invention, the barium compound is present in the drilling fluid in an amount of about ½ to 10%, preferably about 1 to 5% by weight of the weight of the clay. The barium compound is preferably barium oxide.

In other aspects of the invention, the drilling fluid has a pH of about 6 to 9, preferably about 8 to 9, preferably about 6 to 8.5 for salt water drilling fluids and about 6 to 9 for fresh water drilling fluids.

BRIEF DESCRIPTION OF THE DRAWINGS

FIG. 1 is a plot showing the relationship in fresh and NaCl-saturated water, between Fann viscosity and different contents of seven different additive oxides in an "as-is" typical crude, uncalcined attapulgite clay;

FIG. 2 is a plot similar to FIG. 1 but for a vertical milled refined uncalcined attapulgite clay and different contents of three different additive oxides;

FIG. 3 is a plot showing the relationship between Fann viscosity, in fresh and NaCl-saturated water, and different contents of MgO and BaO in a vertical milled refined uncalcined attapulgite clay, the clay content of the BaO-containing drilling fluids being less than that of the MgO-containing drilling fluid; and FIG. 4 is a plot showing the relationship, in fresh and salt water, between Fann viscosity and pH of the finished drilling fluid, containing 2% of the indicated oxide.

DESCRIPTION OF THE PREFERRED EMBODIMENTS

As used herein and in the claims, the term "attapulgite clay" has the generally accepted meaning of a clay material whose predominant mineral species is the clay mineral attapulgite. Attapulgite is a hydrous magnesium aluminum silicate of the empirical formula:

$(OH_2)_4(OH)_2Mg_5Si_8O_{20}4H_2O$

Trivalent cations such as $Al^{+++}$ are equivalent to 1.5 $Mg^{++}$ and may proxy for some of the magnesium (and probably some $Si^{+4}$) in this structure. A typical chemical analysis of attapulgite clay (volatile free basis) is:

|   | Percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 |
|   | 100.0 |

While in the above analysis the magnesium (or proxying aluminum) are expressed as oxides, actually they are present as complex silicates, linked to silicon atoms through oxygen linkage. The calcium content of attapulgite clay is principally in the form of the carbonate.

The attapulgite clay used in the improved drilling fluids of this invention is a colloidal grade which has never been dried to a free moisture content below about 7%. Free moisture (F.M.) is defined as the weight percent of a material eliminated by heating the material to essentially constant weight at about 220° F. (104.4° C.). Preferably, the clay utilized in the drilling fluid has an F.M. content of at least 10%. There is no upper limit to the F.M. content of the clay, although usually it will not exceed 25% so as to avoid the expense of shipping large quantities of water.

The attapulgite clay used in this invention may be raw clay which has received no treatment other than grinding, although preferably the clay has been extruded (with or without BaO or Ba(OH)$_2$) before drying and grinding. Wet screening of the raw clay before extrusion may also be desirable.

Drying of the extruded clay (or extruded admixture of clay and the barium compound of the invention) should be carried out to a product temperature not to exceed about 300° F. (148.9° C.) since higher temperatures have an adverse effect on the yield. Thus, it will not suffice to dry the clay at product temperatures on the order of 400° F. (204.4° C.) or higher, even when drying time is limited to provide a clay having an F.M. content above 7%. As used herein and in the claims, the term "uncalcined" clay means a clay which has never been heated to a product temperature above about 300° F. (148.9° C.) so as to noticeably reduce the yield obtainable therefrom.

Generally, the particle size of the ground extruded clay or clay admixture should be 100% minus 48 mesh (Tyler series) and may be considerably finer, such as 100% minus 325 mesh.

Thickening agents in accordance with this invention can be prepared from uncalcined attapulgite clay and any commercially available BaO or Ba(OH)$_2$. It is not necessary that essentially pure grades of BaO or Ba(OH)$_2$ be utilized in the invention. Grades of these materials containing minor amounts of other compounds such as other alkaline earth metal oxides or hydroxides, e.g., up to about 5% to 25% by weight of calcium and or magnesium compounds may be utilized. The admixture of colloidal attapulgite clay and a barium compound may be prepared by simply mixing and thoroughly blending a barium compound (and, optionally, other additives) with uncalcined preground attapulgite clay e.g., clay which is 100% minus 48 mesh, (Tyler series), preferably extruded ground clay. However, optimum results may be expected when the clay is ground in the presence of the barium compound, e.g., barium oxide. Admixtures in which the clay is ground in the presence of a barium compound additive are as follows: in one, the BaO or Ba(OH)$_2$ is pugged with clay and water prior to extrusion of the clay and the extruded mixture is ground, usually to 100% minus 48 mesh, Tyler series and mildly dried. This procedure effects a very intimate admixture of barium compound additive with clay in the ground particles. In accordance with another procedure, the barium compound additive is thoroughly mixed with moist clay extrudate and the mixture is dried and ground. This procedure appears to lead to a coating of clay particles with adherent powdered additive.

Admixture of attapulgite clay and the barium compound of this invention can be made up into drilling fluids by agitating a previously formed admixture into fresh water or into aqueous solutions of salt, gypsum or the like. Less desirably, some or all of the compound additive can be incorporated separately into the aqueous phase of the mud. No special equipment is needed since the usual mixers or agitators used in making up attapulgite drilling muds may be employed.

When drilling formations containing salt beds, salt domes, gyp, anhydrite and/or combinations thereof, the novel drilling fluids of this invention (even those made up with fresh water) will maintain their high yield upon contamination, without the necessity for chemical treatment as is required with, for example, bentonite muds. Drilling fluids of this invention may have yield points, gel strengths, densities and water-loss properties essentially the same as those made up with attapulgite drilling clay in the absence of any barium compound additive.

The yield of attapulgite clay BaO or Ba(OH)$_2$ admixtures of this invention may be expected to vary somewhat with the system in which yield is measured, with the starting clay, with the quantity of BaO or Ba(OH)$_2$ used, and with the processing employed. Different samples of attapulgite clay, while having essentially the same chemical analysis, may vary somewhat in their response to treatment with a given quantity of BaO or Ba(OH)$_2$.

The efficacy of the present invention is well illustrated by the following examples of specific embodiments thereof.

A first series of drilling fluids was prepared by mixing 14 grams of an uncalcined, colloidal attapulgite clay, 350 ml. of water, fresh or NaCl-saturated as described below and a quantity of BaO sufficient to provide the barium compound additive in respective amounts of 1.0, 2.0, 3.0, 4.0, 5.0 and 10.0 percent by weight of the weight of attapulgite clay. (All references in this specification and in the claims to percent by weight of the weight of attapulgite clay is on the basis of free moisture-free clay, unless specifically otherwise stated.) The ingredients are then blended in a laboratory Waring blender at high shear (600rpm) for three minutes.

For purposes of comparison, a second series of drilling fluids was prepared in a manner identical in all respects to that described above for the first series of drilling fluids, except that corresponding quantities of compouhds other than BaO were used to provide weight percents (as the corresponding oxide) of the other compounds identical to those of the first series of drilling fluids, i.e., respectively 1.0, 2.0, 3.0, 4.0, 5.0 and 10.0 percent by weight on the basis of free moisture-free clay. As indicated by FIG. 1, the comparative compounds utilized were $KO_2$, $Na_2CO_3$, $MgO$, $CuO$, $NaHCO_3$ and $BaCO_3$.

As mentioned above, a determination of Fann viscosity gives a reliable direct correlation to yield of a drilling fluid. Fann viscometer equipment and a standard API Fann viscosity measuring technique are known in the art. The following modified procedure was utilized to make the Fann viscosity measurements referred to herein and in the drawings. The drilling fluid to be tested is first dried in an oven at 150° F. (65.6° C.) for the time required, on the order of several hours, to attain a free moisture content of 14.8±4.0% by weight $H_2O$. The dried clay residue is then micropulverized for passage through a 0.125 inch (0.318 cm) size opening screen. The pulverized dry mixture, in the amount of 14±0.01 grams is mixed with 350 milliliters (ml) of distilled water in a high-shear blade mixer at about 11,000 rpm for exactly twenty-five minutes. The resultant slurry is then rapidly cooled to 77° F. (25° C.) by stirring in a beaker or cup immersed in cooling water. The cooled slurry is then immediately transferred to the cup of a Fann viscometer in which the Fann viscosity is measured after exactly 60 seconds of rotation, at 600 rpm, of the bob of the Fann viscometer. All values of Fann viscosity reported in this application were measured by the above-described procedure. As is well known to those skilled in the art, Fann viscosity is an apparent viscosity which is readily correlateable to standard measures of true viscosity.

With reference to FIG. 1, the dashed line shows the relationship in salt water between Fann viscosity and the content of oxide additive in a typical crude, uncalcined attapulgite clay. The solid lines represent the same relationship in fresh water. The salt water drilling fluids described in this application are, in each case, NaCl-saturated solutions at room temperature, i.e., 72° F. (22.2° C.). As indicated in FIG. 2, barium oxide (BaO) and potassium superoxide ($KO_2$) show significantly higher Fann viscosities than do the other oxide additives, including magnesium oxide (MgO). Accordingly, BaO and $KO_2$ additive drilling fluids were further compared with the MgO-additive drilling fluids of the above mentioned Sawyer et al patent in both fresh and saturated salt water, as shown in FIG. 2. Although the $KO_2$—additive drilling fluid shows quite good results in salt water, it shows wide variations in Fann viscosity in fresh water and is generally much less effective than the MgO-additive drilling fluid at oxide additive levels of up to about 4.5% by weight. The superiority of the BaO-additive drilling fluid to both the potassium superoxide-and magnesium oxide-additive drilling fluids is apparent from FIG. 2 in which, as in FIG. 1, the dashed lines represent the Fann viscosity values in salt water and the solid lines the values in fresh water. Because of the variability in performance of the potassium superoxide-additive fluid and its high cost relative to barium oxide, the potassium superoxide was not considered further as a possible additive.

The apparent superiority of the barium oxide-additive drilling fluid over the magnesium oxide-additive fluid prompted some tests to determine how much less clay could be employed to obtain an equivalent viscosity drilling mud when using barium oxide as compared to the known magnesium oxide additive. FIG. 3 shows in dash lines the results obtained in saturated salt water and in solid lines the results obtained in fresh water when the indicated lesser amounts of clay were employed in the barium oxide-additive fluids as compared to the magnesium oxide-additive fluid. The drilling fluids were prepared in a manner identical to that described with respect to the first series of drilling fluids, utilizing the proportions of ingredients as set forth in Table I following. The percent by weight of barium oxide or magnesium oxide is in all cases based on the weight of attapulgite clay on the basis of free moisture-free clay. Although BaO was used in the tests, $Ba(OH)_2$ should provide substantially similar results. In each case, the indicated quantities of solid ingredients were added to 350 ml of water, fresh or salt-saturated. Six fresh water samples and six salt water samples were prepared for each of the clay-oxide combinations shown in Table I with, respectively, 1.0, 2.0, 3.0, 4.0, 5.0 and 10.0 weight percent oxide.

TABLE I

|  | Clay (gms) | Oxide Content |
|---|---|---|
| Drilling Fluid - Salt Water | | |
| "BaO 25% less clay" | 10.5 | Per FIG. 3, dash lines |
| "BaO 30% less clay" | 9.8 | Per FIG. 3, dash lines |
| "MgO" | 14.0 | Per FIG. 3, dash lines |
| Drilling Fluid - Fresh Water | | |
| "BaO 15% less clay" | 11.9 | Per FIG. 3, solid lines |
| "BaO 30% less clay" | 9.8 | Per FIG. 3, solid lines |
| "MgO" | 14.0 | Per FIG. 3, solid lines |

As shown in FIG. 3, a barium oxide-containing drilling fluid containing 30% by weight less clay than an otherwise identical magnesium oxide-additive drilling fluid provided Fann viscosity values somewhat less than those attained by the magnesium oxide-containing drilling fluid. However, at 25% less clay, the barium oxide-additive salt water drilling fluid showed substantially the same Fann viscosities as the high clay, magnesium oxide-additive drilling fluid, at least at all values above about 2.0% oxide content. In fresh water, the barium oxide-containing drilling fluid containing 30% less clay than the comparable magnesium oxide-additive drilling fluid showed significantly lower Fann viscosities. However, the barium oxide-containing drilling fluid prepared with 15% by weight less clay than the comparable magnesium oxide-additive drilling fluid shows roughly comparable, although slightly lower, Fann viscosities in fresh water at up to about 3.0% oxide additive and, above that oxide content level, shows identical or significantly greater Fann viscosities than the high clay content magnesium oxide-additive drilling fluid. It will be apparent that a significant savings in clay, i.e., greatly enhanced yield, is provided by the barium compound additive of the invention.

In order to assess the effect of variations in pH of the drilling fluid, three types of drilling fluids were prepared using, respectively, magnesium oxide,-potassium superoxide-and barium oxide-additives. Each drilling fluid was made in a manner identical to that described with respect to the first series of drilling fluids, from uncalcined vertical-milled attapulgite clay and included 2% by weight of the respective oxide additive (free moisture-free basis relative to the clay). Fresh water and salt-saturated water slurries of the clay admixture containing about 10 to 15% solids were prepared. Sufficient HCl or KOH was added to the slurries as required to attain initial pH values of 2, 4, 6, 8, 10 and 12. The clay slurry acts as a buffer in the aqueous composition and FIG. 4 shows the final pH values attained after the various samples were allowed to equilibrate for two hours. The preparative pH values, that is, the pH values exhibited before the slurries were allowed to equilibrate were generally about 2 pH units lower than the final pH values indicated in FIG. 4. As indicated in FIG. 4, increasing pH does not significantly adversely effect the Fann viscosity of the barium oxide-additive drilling fluid up to a pH of about 8.5 in salt water and a pH of about 9 in fresh water. Generally a preferred pH range is about 6 to 9 for fresh water drilling fluids and about 6 to 8.5 for salt water drilling fluids. The pH may be that inherently resulting from the mixture of attapulgite clay and barium compound in water, plus any additives utilized, or it may be adjusted by addition of a base or acid as required. For example, the inherent pH of barium compound-containing compositions of the invention as described herein is about 8 to 9 or 9.5 or so, depending largely on the amount of barium compound present.

While the invention has been described in detail with reference to specific preferred embodiments thereof, it will be seen that variations thereto may be made, such as the addition of one or more conventional additives to the drilling fluid, without departing from the spirit and scope of the invention.

What is claimed is:

1. A thickening agent for both fresh water and salt-contaminated aqueous drilling of muds of pH not greater than about 9.5 comprising an admixture of uncalcined colloidal attapulgite clay and a barium compound comprising one or both of barium oxide and barium hydroxide, the barium compound being present in an amount such that aqueous dispersions of the admixture have a greater Fann viscosity in both fresh and salt water than do otherwise identical aqueous dispersions which lack the barium compound.

2. The thickening agent of claim 1 wherein the barium compound is present in an amount of about ½ to 10% by weight of the weight of the attapulgite clay.

3. The thickening agent of claim 1 wherein the barium compound is present in an amount of about 1 to 5% by weight of the weight of attapulgite clay.

4. The thickening agent of claim 1 wherein the barium compound is barium oxide.

5. A thickening agent for aqueous drilling fluids of pH not greater than about 9.5 comprising uncalcined attapulgite clay and a barium compound comprising one or both of barium oxide and barium hydroxide and present in an amount of about ½ to 10% of the weight of the attapulgite clay.

6. The thickening agent of claim 5 wherein the barium compound is present in an amount of about 1 to 5% by weight of the attapulgite clay.

7. The thickening agent of claim 6 wherein the barium compound is barium oxide.

8. The thickening agent of claim 1 wherein the attapulgite clay is composed of particles of minus 48 mesh (Tyler) size.

9. A drilling fluid of Ph not greater than about 9.5 comprising water having dispersed therein uncalcined colloidal attapulgite clay and a finely divided barium compound comprising one or both of barium oxide and barium hydroxide, the proportion of clay to water being such as to form an aqueous mud, and the barium compound being present in an amount such that the mud has a greater Fann viscosity in both fresh and salt water than would an otherwise identical mud which lacks the barium compound.

10. The drilling fluid of claim 9 wherein barium compound is present in an amount of about ½ to 10% by weight of the weight of clay.

11. The drilling fluid of claim 9 wherein the barium compound is present in an amount of about 1 to 5% by weight of the weight of attapulgite clay.

12. The drilling fluid of claim 9 wherein the barium compound is barium oxide.

13. The drilling fluid of claim 9 having a pH of about 6 to 9.

14. The drilling fluid of claim 9 having a pH of about 8 to 9.

15. The drilling fluid of claim 9 wherein the attapulgite clay is comprised of particles of minus 48 mesh (Tyler) size particles.

16. The drilling fluid of claim 9 comprising a salt water drilling fluid having a pH of about 6 to 8.5.

17. The drilling fluid of claim 9 comprising a fresh water drilling fluid having a pH of about 6 to 9.

* * * * *